United States Patent
Farren

[15] 3,657,093
[45] Apr. 18, 1972

[54] ION SELECTIVE ELECTRODE FOR ACTIVITY DETERMINATION OF CATIONS WHICH DO NOT FORM AS IONIC SEMICONDUCTORS

[72] Inventor: Gerard M. Farren, Lombard, Ill.
[73] Assignee: The Perkin-Elmer Corporation
[22] Filed: Mar. 3, 1970
[21] Appl. No.: 16,073

[52] U.S. Cl. .................................... 204/195, 204/1 T
[51] Int. Cl. ............................................. G01n 27/46
[58] Field of Search ........................... 204/1 T, 195

[56] References Cited
UNITED STATES PATENTS
3,431,182  3/1969  Frant .......................... 204/195

Primary Examiner—J. Jung
Attorney—Molinare, Allegretti, Newitt & Witcoff

[57] ABSTRACT

A solid membrane ion-selective electrode is described which is capable of measuring the activity of a cation, e.g., $Ca^{++}$, which does not form an ionic semiconductor. A low solubility fluoride salt of the cation which is not an ionic semiconductor is mixed with another fluoride salt of lower solubility which is an ionic semiconductor to form an imporous membrane. With a suitable contact on one face of the membrane, an electrode results which is responsive to the desired cation in a selective reversible manner.

6 Claims, 2 Drawing Figures

INVENTOR.
GERARD M. FARREN
BY
Molinare, Allegretti, Newitt & Witcoff
ATTORNEYS

ION SELECTIVE ELECTRODE FOR ACTIVITY DETERMINATION OF CATIONS WHICH DO NOT FORM AS IONIC SEMICONDUCTORS

BACKGROUND OF THE INVENTION

This invention relates to a membrane material for use in an ion selective electrode.

Many metallic salts exist which are ionic semiconductors. This means that an electric current may be transported through the solid salt, either in the single or polycrystalline form, by the motion of one of the ions which compose the salt. The movable ion may be the cation, (the metal) or the anion. When only one of the ions moves, the transport number of that ion in the salt is unity and the potential developed at the interface between a body composed of the salt, herein called a membrane, and a solution containing one of the ions composing the salt will follow the well known Nernst equation for a reversible electrode. This potential will then be a measure of the activity of the ion in the solution.

By providing a suitable contact to the other face of the membrane, as e.g. described in U.S. Ser. No. 750,305, filed Aug. 5, 1968, now abandoned, Ser. No. 799,385, filed Feb. 14, 1969, or Ser. No. 819,338, filed Apr. 25, 1969, now abandoned, of which this inventor is one or the joint inventors, an electrode can be made which in a suitable measuring circuit can determine the activity, or concentration, of either the cation or anion of the membrane, whichever is present, in the solution. A number of such ionic semiconductors are known, and their use in electrodes is well known in the art.

In prior art electrodes, however, the membrane was usually contacted by an electrolyte on the distal side of the membrane, and a reversible reference electrode contacted the electrolyte. The art on such electrodes is of long standing and will not be further detailed here.

It has been prior art knowledge since 1902 as shown in Nernst, W., and Riesenfeld, E. H., Am. Physik (4)8, 600 that any relatively insoluble membrane that is shown to be an ionic semiconductor can be used as an ionic membrane in an ion-selective electrode to measure the activities of the ion to which it is permeable, as well as that of certain other ions, in a solution out to a concentration limit set by the solubility of the ionic membrane. However, there are elements, such as calcium, whose salts are either too soluble to be useful in an ion-selective electrode, or, if insoluble, are not ionic semiconductors.

Calcium, particularly, as an important constituent of biological fluids, needs to be measured in clinical laboratories. Its determination also is a measure of the hardness of water; in this magnesium, which is similar to calcium, also plays a role. Methods such as flame photometry, atomic absorption spectrophotometry, titrimetry and fluorimetry have heretofore been used for determining calcium; they, however, determine concentration where a more relevant ionic activity measurement would be preferable.

Despite prior art attempts, the only calcium activity electrode so far practical is the relatively low specificity liquid-liquid interchange electrode, forms of which appear described in U.S. Pat. Nos. 2,614,976; 3,406,102; 3,429,785; 3,438,886; 3,445,365 and 3,448,032. In these there is no solid, imporous, ionic-semiconductor membrane. The membrane shown is porous and electrically inert, serving only as a carrier for an organic-salt of calcium which acts as the ion-selective agent. These electrodes are of complex construction, are bulky in size, have low specificity for Ca, and are temporary in nature requiring frequent refilling.

My invention is a solid state, high specificity calcium electrode. The electrode of my invention belongs to a class of electrodes known as electrodes of the third kind. As defined in the electrochemical art, an electrode of the third kind can be represented by:

$R/C_1A, C_2A//Sol\ C_1$ (or A) where R is a reference electrode making contact with the membrane through the interface designated by the slash (/). $C_1A$ is a salt of the cation $C_1$ being measured with anion, A, having a relatively low solubility and not being an ionic semiconductor. $C_2A$ is a salt of another cation $C_2$ not being measured with the same anion, A, having a lower solubility than $C_1A$ and being an ionic semiconductor with A the mobile ion. $C_1A$ and $C_2A$ are physically intermixed to form a solid state membrane. Sol C is the solution being analyzed for the activity of $C_1$ (or A) the solution being in contact with the membrane at the interface designated by the double slash (//). (The response to A is as an electrode of the second kind.)

Electrodes of the third kind are known to prior art for a limited number of combinations. Because of the solubility relation indicated above, the discovery of useful combinations is not inherently obvious or inevitable. For this reason the only prior art electrode systems of the third kind I have been able to discover which determine Ca are:

$R/Hg,\ CaOx,\ Ca(NO)_3$ (ag) // Sol Ca and, $R/Hg,\ HgWO_4,\ Ca(NO_3)_2$ (ag) // Sol Ca, See LeBlanc, M., and Harnapp, O., Z. physik Chem A166, 321 (1933).

These systems are not easy to make or use because the constituents form a paste with the mercury and a true solid electrode of simple structure is not realized. In this respect the previously cited liquid-liquid interchange calcium electrode systems are preferable to the above systems. Furthermore, both the above systems have a metallic conductor, mercury, extending through the membrane and contacting the solution to be analyzed. Hence, these electrodes are subject to redox errors when the solution contains oxidizing or reducing agents. They will not operate unless the mercury is in contact with said solution because the salts are not ionic semiconductors. Despite the poor prior art for Ca, certain other electrodes of the third kind provide good measurement results. One of these is the commercially used form:

$R/PbS,\ Ag_2S//Sol\ Pb.$

This electrode is superior to the lead reference electrode of the second kind:

$R/PbF_2//Sol\ Pb$ because the solubility of PbS is lower than that of $PbF_2$ and hence the former can measure to four orders of magnitude lower concentration solution, i.e., $10^{11.6\ 7}M$ as compared with $10^{-3}M$.

SUMMARY OF THE INVENTION

In a principal aspect, the present invention is an electrode of the third kind with a solid, imporous membrane having no liquid content and completely insensitive to redox errors. I have discovered that certain fluoride salts such as $ScF_3$, $YF_3$, $BiF_3$, and the lanthanide series of fluorides are sufficiently insoluble, while at the same time they are ionic semiconductors and may be combined intimately with $CaF_2$, which is relatively insoluble (but more soluble than the aforementioned fluorides) and is not a semiconductor, to form a solid, imporous membrane from which an electrode specific to Ca can be fabricated. A similar mixture of fluoride salts can be used substituting $MgF_2$ to provide a Mg electrode. Alternatively, a combination of the two salts can be used to give a combined "water hardness" electrode.

Thus it is an object of my invention to provide a solid state electrode free from liquid membrane constituents for ionic measurement of cations whose salts do not form suitable ionic semiconductors so that they might be used as an electrode of the second kind.

It is a further object of my invention to make an electrode membrane of the third kind utilizing a novel mixture of fluoride salts to take advantage of the extreme insolubility of such salts in extending the usable range of the electrode membrane.

It is also an object of my invention to make a solid electrode for the determination of Calcium.

It is still another object of my invention to make a class of electrodes capable of determining Ca, Mg, and other metals or combinations of such metals having relatively insoluble fluorides which are not ionic semiconductors.

It is also an object of my invention to achieve greater specificity, smaller practical size, greater durability, less temperature sensitivity, greater simplicity and less maintenance difficulty in an electrode for measurement of Ca and other metals previously specified.

BRIEF DESCRIPTION OF THE DRAWING

In the detailed description which follows, reference will be made to the drawing comprised of the following FIGS.

DESCRIPTION OF THE PREFERRED EMBODIMENT

Figure 1:
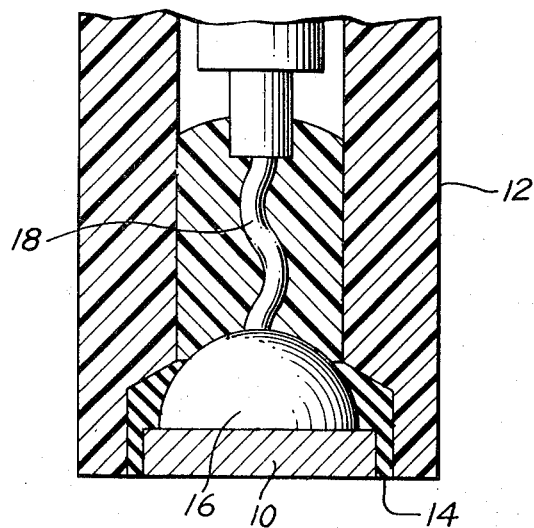
FIG. 1 illustrates in a cross-sectional view a specific embodiment of my electrode.

Referring to FIG. 1 the membrane 10 is in the form of a disc. The shape and size of the membrane 10 are not limiting on its function, a disc being merely a convenient shape. The membrane 10 is sealed into the end of a suitable supporting stem 12 with a sealant 14. Details on such matters are covered in my patent applications referred to early in this disclosure. A suitable contact 16 is made to the distal face of the membrane 10 and connection to an electrical lead wire 18 thereby effected. Except insofar as herein discussed, details of the contact are not part of subject invention.

Figure 2:
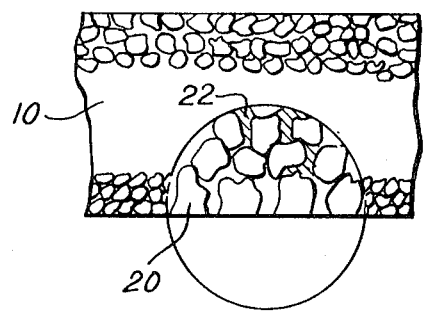
FIG. 2 illustrates in a cross-sectional view one type of membrane comprising the invention.

The membrane 10 may be made in several ways:

1. By admixture of constituents and subsequent compressing under high pressure to form a non-porous compact,
2. By deposition of a porous coating of the non-semiconductor on the surface of a single crystal or polycrystalline compact of the ionic semiconductor component, or
3. By formation of a porous membrane comprising the constituents, as at 20 in FIG. 2, admixed and sealing this membrane with an inert sealant, as at 22 in FIG. 2, in its interstices to render it impervious.

When manufacturing the membrane 10 for measurement of $Ca^{++}$, for example, by the first method I mix purified $LaF_3$ and $CaF_2$ crystalline powder of as fine a mesh as practical. The ratio can be preferably between 10 percent and 50 percent of $CaF_2$ by mole ratio. This ratio range is advisory only. The electrode action will gradually lessen as the ratio approaches 0 and 100 percent. The mixture may also be prepared by coprecipitation from a solution of La and Ca salts, e.g., nitrates or chlorides, by adding NaF. This mixture is loaded into a die and compressed under conditions similar to those recited in U.S. Pat. No. 3,206,279 to secure a nonporous compact. In practicing the second method of manufacture I clean the surface of the ionic-semiconductor member by the usual methods used for vapor deposition. The member is then placed in the vacuum system and a coating of $CaF_2$ is deposited by vapor deposition, sputtering or other means of choice. The coating must cover the whole surface to avoid a non-uniform response from point to point. The coating must be as thick as possible but must remain porous if $CaF_2$ only is being deposited. A trace of inert gas up to a couple of mm. Hg, as is known in the art, for the deposition of metallic blocks, facilitates maintenance of porosity though too high a degree will give a fragile coating. An alternative method not developing porosity is to evaporate a mixture of $CaF_2$ and $LaF_3$ at a high vacuum. This can be done directly onto a bismuth or lead metal rear contact 16. The mole ratio of $CaF_2$ should be kept between 5 percent and 25 percent in the mixture because of the greater volatility of the $CaF_2$ as compared with $LaF_3$. This range, again, is not a limitation but a suggested working range. The sealed porous membrane 10 of FIG. 2 may be formed by methods set forth in U.S. Ser. No. 799,385. The recommended mixture ratio is the same as for the nonporous compacted membrane. Other methods of producing this membrane are possible, and it is not my intention to limit myself by the method used to produce the membrane of my invention. The choice of methods is one of cost, convenience, durability and other such factors. All methods achieve the objects of my invention and are not limited on the invention.

I prefer to use $LaF_3$ as the ionic semiconductor because of its extremely low solubility. However, $ScF_3$ or $YF_3$ may also be advantageously used. $BiF_3$ could also be used, however, it is also responsive to $Cl^-$. If $Cl^-$ is not present in the sample this is no problem; for a clinical electrode, however, chloride would be present and $BiF_3$ could not be used. Other fluoride salts in the lanthanide series may also be used.

The solubility products of the possible components of the membrane 12 are not at this time all known with certainty. They approximate:

| Ionic Semiconductors | | Non-semiconductors | |
|---|---|---|---|
| $LaF_3$ | $10^{-18}$ | $CaF_2$ | $10^{-11}$ |
| $ScF_3$ | $10^{-15}$ to $10^{-18}$ | $MgF_2$ | $10^{-9}$ |
| $YF_3$ | " | | |
| $BiF_3$ | " | | |

The non-semiconductors satisfy the requirement that their solubility product must be greater than that of the ionic semiconductor. If this were not so, the ions of the former would displace those of the latter from the solution, and the electrode would not respond to the former.

Operation as an electrode can be explained using the $CaF_2$, $LaF_3$ combination. A solution containing $1M Ca^{++}$ ion will remove $F^-$ from the face of the electrode according to the expression:

$$(Ca^{++})(F^-)^2 = 10^{-11}$$
$$\text{If Ca is } 1M: (1)(F^-)^2 = 10^{-11}$$
$$F^- = \sqrt{10^{-11}}$$
$$= 3 \times 10^{-6} \text{ approx.}$$
$$\text{If Ca is } 10^{-2}M: (10^{-2})(F^-)^2 = 10^{-11}$$
$$F^- = \sqrt{10^{-9}}$$
$$= 3 \times 10^{-4} \text{ approx.}$$

The activity of the released $F^-$ is then measured by the electrode as a fluoride electrode. The response will follow the Nernst relationship but will be reversed in slope as a measure of $Ca^{++}$. By extending the above to lower $Ca^{++}$ concentration to the point where $F^-$ concentration is the same, the lower usable limit of the electrode as a $Ca^{++}$ electrode is found to be approximately $1.4 \times 10^{-4}$ M. This makes the electrode suitable to cover the range of biological fluids and significant water hardness. In comparison with prior art liquid-liquid interchange electrode, the merits of the electrode of my invention make it of much greater accuracy and utility. Comparing the $Ca^{++}$ electrode, I find the following:

| | Prior Art | Invention |
|---|---|---|
| $Sr^{++}$ interference | 0.017* | 0.010 |
| $Mg^{++}$ " | 0.014 | 0.005 |
| $Pb^{++}$ " | 0.63 | 0.001 |
| $Ba^{++}$ " | 0.01 | 0.00001 |
| $Na^+$ or $K^+$ " | variable | negligible |
| $H^+$ error below | 5.5 pH | 4 pH |

*Thus 1M of $Sr^{++}$ introduces an error in the $Ca^{++}$ reading of 0.017M and so on for the remaining ions.

The interferences given are typical. Because of the improved accuracy of my electrode, it is especially useful for biological measurements.

While I have used $CaF_2$ and $LaF_3$ as example mixed constituents, it is a matter of choice to substitute other ionic semiconductors of the fluoride type with $CaF_2$ for a Ca electrode, or to use $MgF_2$ with any of the fluoride semiconductors to produce a magnesium electrode. Other similar combinations may suggest themselves to one skilled in the art having read this disclosure.

What is claimed is:

1. An ion selective electrode for measuring the activity of a cation, the salts of said cation being the type which do not form ionic semiconductors, said electrode comprising a solid, imporous membrane, said membrane comprised of a mixture of
   a first fluoride salt of the cation selected from the group consisting of $CaF_2$, $MgF_2$ and a mixture of $CaF_2$ and $MgF_2$; and
   at least one second fluoride salt of relatively lower solubility selected from the group consisting of $ScF_3$, $YF_3$, $BiF_3$ and each salt of the lanthanide series of fluorides, said second fluoride salt being an ionic semiconductor.

2. The electrode of claim 1 wherein one face of said membrane is in electrical contact with electrical conduction means and wherein the opposite face is adapted to contact a solution in which said cation activity is being measured.

3. The electrode of claim 1 wherein said membrane is comprised of a compressed powder mixture of the constituents.

4. The electrode of claim 1 wherein said membrane is comprised of a porous coating of said first fluoride salt on a nonporous portion including said second fluoride salt.

5. The electrode of claim 1 wherein said membrane is comprised of a porous portion comprising said fluoride salt constituents admixed and sealed with an inert sealant to render said membrane imporous.

6. The mixture of claim 1 wherein said cation fluoride comprises between 10 and 50 percent by mole weight of the mixture.

* * * * *